May 7, 1963 W. B. SHUTE 3,088,454
SURGICAL INSTRUMENT
Filed July 25, 1960 2 Sheets-Sheet 1
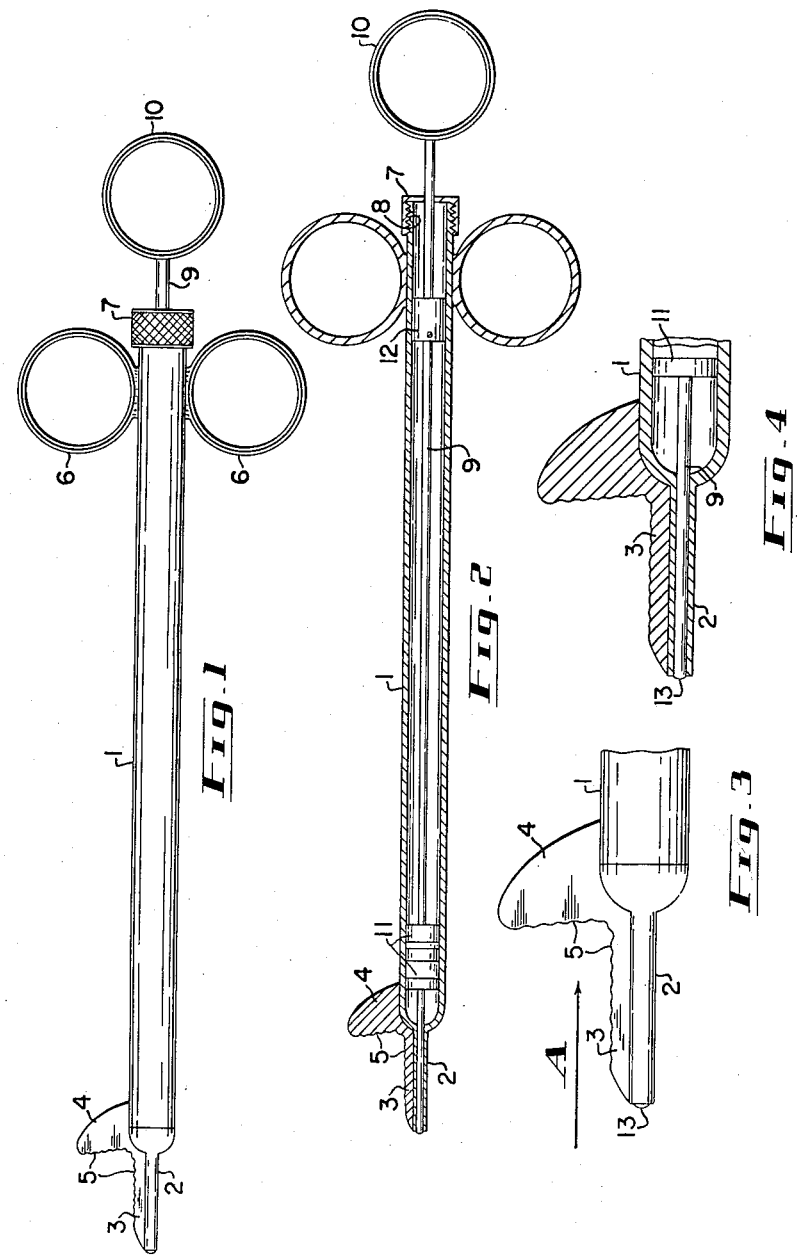

May 7, 1963 W. B. SHUTE 3,088,454
SURGICAL INSTRUMENT
Filed July 25, 1960 2 Sheets-Sheet 2

Wallace B. Shute
INVENTOR
By Cushman, Darby & Cushman
ATTORNEYS

United States Patent Office 3,088,454
Patented May 7, 1963

3,088,454
SURGICAL INSTRUMENT
Wallace B. Shute, 300 Island Park Drive,
Ottawa, Ontario, Canada
Filed July 25, 1960, Ser. No. 44,916
Claims priority, application Canada Jan. 6, 1960
1 Claim. (Cl. 128—2)

This invention relates to a surgical instrument and more particularly to the type of instrument for collecting tissue cells for use as specimens for cytological diagnosis.

When considering the detection of cancer of the cervix and uterus, it is preferable to obtain tissue cells or scrapings from as many different locations of the cervix and uterine cavity as possible in order that the smears might be comprehensive.

Whilst heretofore known surgical instruments have proved to be effective, they have been somewhat limited in their application. For instance, it is known to obtain tissue cells from the cervix by means of a spatula which, when rotated, collects scrapings therefrom. It is also known to collect mucus from the internalos of the cervix by means of an inserted pipette tube. However, no instrument has, heretofore, been devised for obtaining tissue cells from at least two separate and distinct locations of the cervix and from the uterine cavity and it is the object of this invention to provide a simple and relatively inexpensive instrument for achieving such a purpose.

Accordingly, this invention relates to a surgical instrument for collecting cells for use as specimens for cytological diagnosis comprising an elongated body, a first blade on one end portion of said body, said end portion having a longitudinal axis, said end portion and said first blade being capable of insertion into the cervical canal of the uterus and extending to the internalos of the cervix, an operative edge on said first blade extending parallel with said longitudinal axis and adapted, on rotation of said one end portion about its said longitudinal axis, to obtain individual tissue cells from the endocervix, a second blade on said body located adjacent to said end portion, said second blade having an operative edge extending transversely to said first mentioned serrated edge and adapted, on said rotation of the end portion, to obtain individual tissue cells from the portio vaginalis of the cervix.

This invention is illustrated in the accompanying drawings in which:

FIGURE 1 is an elevation of the surgical instrument,

FIGURE 2 is a sectional elevation of the surgical instrument,

Figure 5:
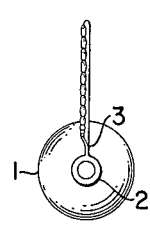
Figure 6:
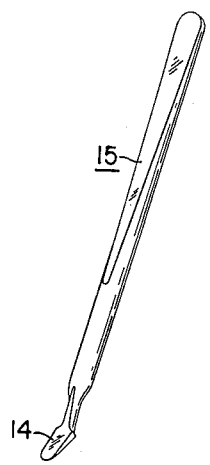
Figure 7:
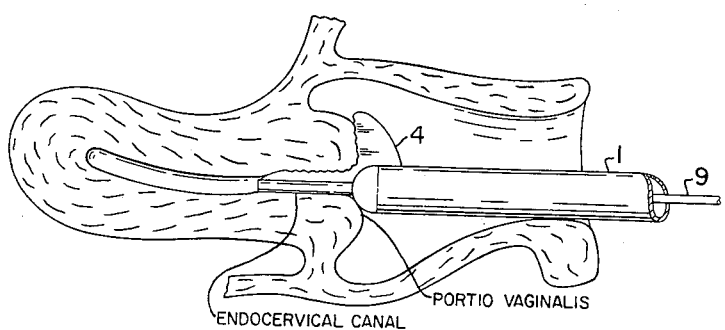

FIGURES 3 and 4 are, respectively, elevational and sectional elevational view of one end portion of the instrument on an enlarged scale, FIGURE 5 is an end view of FIGURE 3 looking in the direction of the arrow A, FIGURE 6 is a view of a spatula adapted for use with the surgical instrument of the present invention, and FIGURE 7 is a diagrammatic view of the instrument and its relation to the cervix when tissue cells are being collected.

Referring to the drawings, and more particularly to FIGURES 1 to 5, it will be seen that the preferred form of the surgical instrument includes an elongated body or cylinder 1 having one end portion 2 considerably reduced in diameter, said end portion 2 having a longitudinal axis. Fast with the end portion 2 and extending along its length is a first or endocervical blade 3 which gradually merges into a second blade for the portio vaginalis 4 projecting from the distal end of the main body of the cylinder 1. As will be seen from FIGURES 3 and 4, the blades 3 and 4 are each provided with a serrated edge 5 by means of which scrapings can be obtained and as will be described hereinafter. The serrated edge 5 of the first blade 3 extends parallel with the longitudinal axis of the end portion 2 of the cylinder 1, whereas the serrated edge 5 of the second blade 4 extends transverse to said longitudinal axis.

A pair of diametrically opposed finger-grips 6 are provided on the cylinder adjacent the end thereof remote from the end portion 2 and, as will be seen from reference to FIGURE 2, the finger-grip end of the cylinder 1 is closed by means of a centrally bored detachable end cap 7 in threaded engagement with screw threads 8 formed on the finger-grip end of the cylinder 1.

Centrally disposed within the cylinder 1 is a plunger rod 9 one end of which projects through the end cap 7 and which terminates in a thumb-grip 10. Fast on the plunger rod 9 and located adjacent the end portion 2 of the cylinder 1 is a plunger 11 in frictional slidable engagement with the inner periphery of the cylinder 1. The plunger rod 9 is also provided with a stop-member 12 pinned thereto and located adjacent the end-cap 7 of the cylinder 1. Furthermore, as will be seen more clearly from reference to FIGURES 3 and 4, the end face 13 of that portion of the plunger rod 9 slidable within the end portion 2 of the cylinder 1 is convex and projects slightly beyond said end portion 2 so as to serve as a pipette obturator.

The operation of the instrument is such that the surgeon inserts the said instrument into the vagina so that the end portion 2 of the cylinder, as well as the first blade 3, will be located within the cervical canal of the uterus, and will extend to the internalos of the cervix. At the same time, the second blade 4 will be located adjacent the portio vaginalis of the cervix.

The surgeon thereupon rotates the instrument so that the serrated edge 5 of the first blade 3 will obtain scrapings from the endocervix. Simultaneously, the serrated edge 5 of the second blade 4 will obtain scrapings from the portio vaginalis.

Thereafter, by withdrawing the plunger rod 9 by means of the thumb-grip 10, the pipette obturator end 13 of the plunger, will suck cellular debris and mucus from the uterine cavity and the internalos of the cervix into the end portion 2 of the cylinder 1. FIGURE 7 shows diagrammatically the position of the instrument and its relation to the uterus and cervix when samples are required to be taken from the three locations just mentioned.

After withdrawal of the instrument, the plunger rod 9 is depressed so that the pipette obturator 13 will eject the cellular debris from the uterus and internalos of the cervix, therein onto a glass slide to enable a smear to be made. Thereafter, the operative end 14 of a spatula, such as that indicated generally at 15 in FIGURE 6, is employed to remove the scrapings from the first and second serrated blades 3, 4 and to transfer such scrapings to slides to enable smears to be made therefrom.

The detachable end cap 7 serves to retain the plunger rod 9 within the cylinder 1 and also serves as a stop to limit the amount of sliding movement of the plunger in one direction. Movement of the plunger rod 9 in the opposite direction is controlled by the engagement of the plunger 11 with the end of the cylinder 1 where it merges into the end portion 2.

Obviously, when the end cap 7 is detached from the cylinder 1, complete sterilization of the instrument can occur before reuse.

Obviously, it is within the scope of the invention to omit the serrations on the operative edge of each blade.

I claim:

A surgical instrument for collecting cells for use as specimens for cytological diagnosis comprising, in combination, an elongated cylindrical body having a reduced operative end portion; a first blade, having a longitudinal axis, mounted on said operative end portion, the latter and said first blade being capable of insertion into and extending throughout the entire length of the cervical canal to the internal os; an operative edge on said first blade extending parallel with said longitudinal axis and adapted, on rotation of said operative end portion about its longitudinal axis, to obtain individual tissue cells, by scraping, from the entire endocervix; a second blade mounted on said body and located adjacent said operative end portion, said second blade having an operative edge extending normal to said first blade and adapted, on rotation of said operative end portion, to obtain by scraping, and simultaneously with the operation of the first blade, individual tissue cells from the portio vaginalis of the cervix, an end cap detachably secured to the end of the body remote from said operative end portion; finger grips on said remote end; a plunger rod slidably mounted within said body and, at one end thereof, projecting beyond said end cap and terminating in a thumb-piece; at least one plunger fast on said rod and in slidable frictional contact with the inner periphery of the body; a stop member fast on said rod and located a predetermined distance between said plunger and said cap to limit the amount of movement of said rod in one direction, movement of said rod in the other direction being limited by engagement of said plunger with the body where the latter merges with its reduced operative end; that portion of the rod extending beyond the end, remote from said stop, of the plunger being slidable within and throughout the said operative end portion and normally projecting slightly beyond the latter and serving, with the inner periphery of said operative end portion, as a pipette obturator, the end face of said rod slightly projecting beyond said operative end portion being convex whereby the said operative end portion, plunger, rod, stop, body, end cap, grips and thumb piece co-operate to ensure that the pipette extracts, by positive suction, cellular debris from the uterine cavity and internal os of the cervix, said scrapings and said extraction being obtained selectively.

References Cited in the file of this patent

UNITED STATES PATENTS

| | | |
|---|---|---|
| 752,356 | Pilling | Feb. 16, 1904 |
| 1,867,624 | Hoffman | July 19, 1932 |
| 2,839,051 | Chester | June 17, 1958 |

FOREIGN PATENTS

| | | |
|---|---|---|
| 25,718 | Great Britain | 1913 |
| 815,046 | Great Britain | June 17, 1959 |